Sept. 16, 1924.  S. E. HALES  1,508,654
PNEUMATIC APPARATUS
Filed Feb. 14, 1923
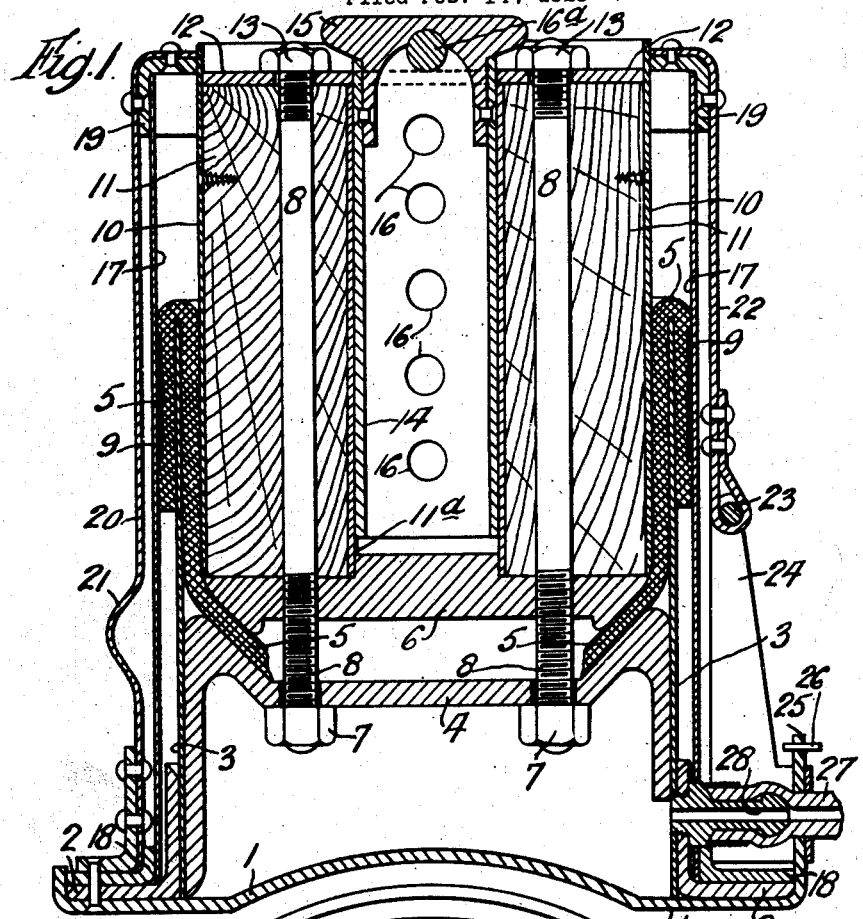
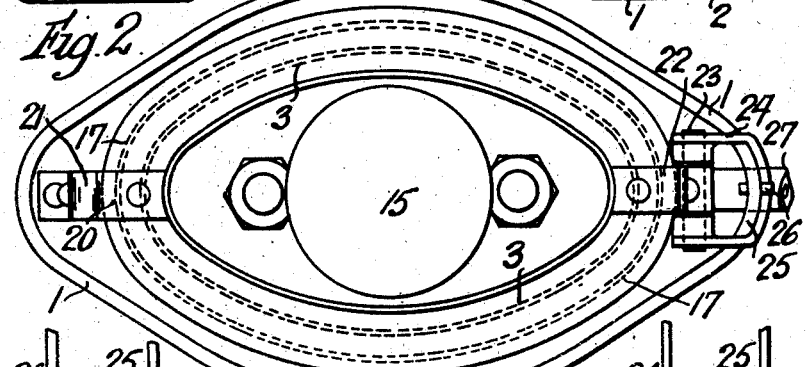
Inventor,
Sidney Eales Hales,
By his Attorneys,
Baldwin Wight Patented Sept. 16, 1924.

1,508,654

UNITED STATES PATENT OFFICE.

SIDNEY EALES HALES, OF LONDON, ENGLAND.

PNEUMATIC APPARATUS.

Application filed February 14, 1923. Serial No. 618,924.

*To all whom it may concern:*

Be it known that I, SIDNEY EALES HALES, a subject of the King of Great Britain, residing at 122 Thanet House, Thanet Street, King's Cross, London, England, have invented new and useful Improvements in Pneumatic Apparatus, of which the following is a specification.

This invention relates to improvements in pneumatic jacks, shock absorbers or the like of the type comprising a piston and cylinder adapted to move or be moved relatively to one another.

In carrying out my invention I employ a known form of packing comprising a flexible tube doubled back and rolling over itself.

In a jack or shock absorber constructed according to my invention I preferably employ a length of plain tube, i. e., a piece of tubing not having enlarged or otherwise specially shaped ends to form a packing between the piston and cylinder, or alternatively, that end of the tube which is to be attached to the piston may be incurved.

An air tight joint between the tube and piston is made by a plate which presses the tube on to the end of the piston and is so shaped as to slide freely in the cylinder and form a guide. The other end of the tube is doubled over the open end of the cylinder and may conveniently be secured thereto by a binding of string, wire or other like flexible material.

In order to relieve the tube of bursting pressure as much as possible, an outer sleeve or casing is provided to confine that part of the tube which projects beyond the cylinder.

Preferably this sleeve or casing is inturned (at that end which in all positions of the apparatus surrounds the piston) so as to form a guide, or may be provided with an in-turned ring capable of small limited movement and adapted to cut off the supply of air to the cylinder should the piston be raised beyond its normal stroke thus limiting the travel of the piston.

Air under pressure can be admitted to the cylinder through a pipe having a non-return valve.

It will be seen that in apparatus made in the manner described above, the pressure of air forces the tube away from the inner surface of the cylinder thereby preventing or minimizing friction between the cylinder and tube and that the tube is also prevented from coming into contact with the open end of the cylinder.

In the accompanying drawings which illustrate my invention, Figure 1 is a vertical section, Figure 2 is a plan, and Figures 3 and 4 are detail views showing the flexible tube in the open and "nipped" position.

1 is a base plate having secured thereto preferably by brazing a flanged ring 2 to which is brazed or otherwise secured a steel tube 3 forming a cylinder containing a piston constructed as follows. 4 is a flanged plate which forms the base of the piston, sliding freely in the cylinder 3 and forming a guide to steady the piston. 5 is a tube of flexible material which forms the packing between the piston and the cylinder 3. One end of the tube 5 is clamped between the flanged plate 4 and a plate 6 by means of nuts 7 screwing on studs 8 while the other end of the flexible tube 5 is doubled over the open end of the cylinder 3 and is secured thereto by a binding 9 of string or wire. 10 is a tube containing a filling piece of wood 11 which is clamped between a plate 12 and the plate 6 by nuts 13 on the studs 8. The filling piece 11 is provided with a liner 11ᵃ adapted to receive a tube 14 to the top of which is secured a head 15. The tube 14 is provided with a series of holes 16 to enable it to be adjusted as to height by raising or lowering it and passing through a suitable hole 16 a pin 16ᵃ which rests upon the plate 12. 17 is a sleeve or casing which surrounds the flexible tube 5 and confines that part of it which projects beyond the cylinder 3 when the piston is raised thus relieving the tube as much as possible of bursting strain. The sleeve 17 is positioned at its lower end by a flanged ring 18 riveted to the base plate 1 and slidably engages at its upper end with a flanged ring 19 which forms a guide for the tube 10. The ring 19 is connected to the base 1 by a strip 20 of flexible material and is bent as indicated at 21 to allow the ring 19 to be raised slightly should the piston be raised beyond its normal stroke. The ring 19 has also secured to it a strip 22 the end of which is bent over to secure a pin 23 which engages holes in a plate 24 which is U shaped in cross section. The base plate 1 is provided with an upturned projection 25 the outer surface of which is in contact with or close to the lower part of the inner surface of the plate 24. 26 is a stop provided on the projection 25 and adapted to limit the travel of the plate 24. Air under pressure can be admitted to the interior of the cylinder 3 through a flexible tube 27 connected to a pump or other source of supply, and passing through holes in the plate 24 and projection 25 which holes normally are in alinement. The tube 27 is connected to a nipple 28 screwing into the flanged ring 2 and cylinder 3.

In operation when air under pressure is admitted to the interior of the cylinder 3, the flanged plate 4 and the other parts of the piston are raised, the flexible tube 5 rolling over itself. Should air under pressure continue to be supplied to the interior of the cylinder for such a time as to force the piston to exceed its normal travel the flanged plate 4 will force the flexible tube 5 against the flanged ring 19 and straighten out the bend in the flexible strip 20. This movement of the flanged ring 19 will at the same time, through the strip 22, raise the plate 24 and move the hole therein out of alinement with the hole in the projection 25 thus nipping the tube 27 and shutting off any further supply of air under pressure. It is obvious that any convenient manner of connecting the cylinder 3 and sleeve 17 to the base 1 may be employed.

It may be observed that the apparatus described can readily be employed as a shock absorber by attaching the cylinder or piston to the spring or axle of a vehicle or to the chassis, the cylinder being filled with air under pressure suitable for the load or weight of the vehicle.

What I claim is:—

1. In pneumatic apparatus the combination of a cylinder, a piston, a flexible tube packing and a plate which clamps one end of the packing on to the piston to form an air tight joint between the piston and cylinder and whose outer periphery makes contact with the cylinder and guides the piston.

2. In pneumatic apparatus the combination of a cylinder, a piston, a flexible tube packing doubled over the open end of the cylinder, means for securing one end of the flexible tube to the cylinder and an outer sleeve adapted to confine the tube.

3. In pneumatic apparatus the combination of a cylinder, a piston, a flexible tube packing doubled over the open end of the cylinder, means for securing one end of the flexible tube to the cylinder, an outer sleeve adapted to confine the tube, and a flange supported by the sleeve forming a guide for the piston.

4. In pneumatic apparatus the combination of a cylinder, a piston, a flexible tube packing doubled over the open end of the cylinder, means for securing one end of the flexible tube to the cylinder, an outer sleeve adapted to confine the tube, and a flange supported by the sleeve which forms a guide for and limits the travel of the piston.

5. In pneumatic apparatus the combination of a cylinder, a piston, a flexible tube packing doubled over and secured to the open end of the cylinder, an outer sleeve adapted to confine the tube, an inlet to the cylinder and means for automatically closing the inlet at the end of the piston stroke.

6. In pneumatic apparatus the combination of a cylinder, a piston, a flexible tube packing doubled over and secured to the open end of the cylinder, an outer sleeve adapted to confine the tube, an inlet to the cylinder, means actuated by the piston for closing the inlet at the end of the piston stroke.

7. In pneumatic apparatus the combination of a cylinder, a piston, a flexible tube packing, a plate which clamps one end of the packing on to the piston to form an air tight joint between the piston and cylinder and also guides the piston in the cylinder, a head carried by the piston and means for adjusting the height of the head relatively to the piston.

8. In pneumatic apparatus the combination of a cylinder, a piston, a flexible tube packing which is doubled over the open end of the cylinder, means for securing one end of the flexible tube to the cylinder, and a plate which clamps the other end of the flexible tube to the piston to form an air tight joint between the piston and cylinder and whose outer periphery makes contact with the cylinder and guides the piston.

9. In pneumatic apparatus the combination of a cylinder, a piston, a flexible tube packing which is doubled over the open end of the cylinder, means for securing one end of the flexible tube to the cylinder, a plate which clamps the other end of the flexible tube to the piston to form an air tight joint between the piston and cylinder and also guides the piston in the cylinder, and an outer sleeve adapted to confine the tube.

10. In pneumatic apparatus the combination of a cylinder, a piston, a flexible tube packing which is doubled over the open end of the cylinder, means for securing one end of the flexible tube to the cylinder, a plate which clamps the other end of the flexible tube to the piston to form an air tight joint between the piston and cylinder and whose outer periphery makes contact with the cylinder and guides the piston, an outer sleeve adapted to confine the tube, and a flange supported by the sleeve forming a second guide for the piston.

11. In pneumatic apparatus the combination of a cylinder, a piston, a flexible tube packing which is doubled over the open end of the cylinder, means for securing one end of the flexible tube to the cylinder, a plate which clamps the other end of the flexible tube to the piston to form an air tight joint between the piston and cylinder and also guides the piston in the cylinder, an outer sleeve adapted to confine the tube and a flange supported by the sleeve which forms a second guide for and limits the travel of the piston.

12. In pneumatic apparatus the combination of a cylinder, a piston, a flexible tube packing which is doubled over the open end of the cylinder, means for securing one end of the flexible tube to the cylinder, a plate which clamps the other end of the flexible tube to the piston to form an air tight joint between the piston and cylinder and also guides the piston in the cylinder, an outer sleeve adapted to confine the tube, an inlet to the cylinder and means for automatically closing the inlet at the end of the piston stroke.

13. In pneumatic apparatus, the combination of a cylinder, a piston, a flexible tube packing which is doubled over the open end of the cylinder, an outer sleeve adapted to confine the tube, a ring slidably mounted on said outer sleeve and adapted to be moved by the piston at the end of its stroke, an inlet to the cylinder, and means actuated by the said ring for closing the inlet at the end of the piston stroke.

In testimony that I claim the foregoing as my invention I have signed my name this 11th day of January, 1923.

SIDNEY EALES HALES.